United States Patent
Hayama (10) Patent No.: US 7,785,205 B2
(45) Date of Patent: Aug. 31, 2010

(54) CROSS GROOVE CONSTANT VELOCITY UNIVERSAL JOINT

(75) Inventor: Yoshihiko Hayama, Iwata (JP)

(73) Assignee: NTN Corporation, Osaka (JP)

(*) Notice: Subject to any disclaimer, the term of this patent is extended or adjusted under 35 U.S.C. 154(b) by 298 days.

(21) Appl. No.: 11/887,054

(22) PCT Filed: Mar. 6, 2006

(86) PCT No.: PCT/JP2006/304232

§ 371 (c)(1),
(2), (4) Date: Sep. 24, 2007

(87) PCT Pub. No.: WO2006/100893

PCT Pub. Date: Sep. 28, 2006

(65) Prior Publication Data

US 2009/0069101 A1    Mar. 12, 2009

(30) Foreign Application Priority Data

Mar. 24, 2005  (JP) .............. 2005-086996
Mar. 24, 2005  (JP) .............. 2005-086997

(51) Int. Cl.
    *F16D 3/226* (2006.01)
(52) U.S. Cl. .................. 464/144; 464/906
(58) Field of Classification Search ........... 464/144, 464/906

See application file for complete search history.

(56) References Cited

U.S. PATENT DOCUMENTS 6,817,950 B2 * 11/2004 Dine .................. 464/906

FOREIGN PATENT DOCUMENTS

| JP | 5-231435 | 9/1993 |
| JP | 11-278075 | 10/1999 |
| JP | 2003-21159 | 1/2003 |

OTHER PUBLICATIONS

English translation of the International Preliminary Report on Patentability, dated Oct. 4, 2007.
E. R. Wagner, "Cross Groove Universal Joint", SAE, 1991, pp. 163-166.
International Search Report (PCT/ISA/210) of International Application PCT/JP2006/304232 (mailed on May 23, 2006).

* cited by examiner

*Primary Examiner*—Greg Binda (57) ABSTRACT

A cross groove constant velocity universal joint for a drive shaft or a propeller shaft of an automotive vehicle includes an inner ring and an outer ring each having ball grooves which are alternately slanted in respective directions opposite to each other while alternating with each other in a direction circumferentially thereof. Torque transmission balls are positioned at a crossing area where each of the ball grooves in the inner ring and the associated ball groove in the outer ring are crossed with each other. A cage is provided to retain the torque transmission balls. The number of torque transmission balls is ten, and a crossing angle between the axis of the inner or outer ring and each of the ball grooves in the inner or outer ring is within the range of 10 to 15° or 6 to 9° for the drive shaft or the propeller shaft, respectively.

6 Claims, 8 Drawing Sheets

CROSS GROOVE CONSTANT VELOCITY UNIVERSAL JOINT

CROSS REFERENCE TO RELATED APPLICATIONS

This application claims the benefit under 35 U.S.C. Section 371, of PCT International Application Number PCT/JP2006/304232, filed Mar. 6, 2006 and Japanese Application Nos. 2005-086996 and 2005-086997, filed Mar. 24, 2005 respectively, in Japan, the contents of which are incorporated herein by reference.

FIELD OF THE INVENTION

The present invention relates to a cross groove constant velocity universal joint for use in association with a drive shaft or a propeller shaft of an automotive vehicle.

BACKGROUND OF THE INVENTION

The cross groove constant velocity universal joint is of a type, in which ball grooves, defined in an inner ring, and ball grooves defined in an outer ring, which are paired with the ball grooves in the inner ring, are slanted in respective directions reverse to each other relative to an axis and a torque transmission ball is retained at a crossing area where each of the ball grooves in the inner ring and the respective ball groove in the outer ring are crossed with each other. Because of the structure described above, it is possible to minimize rattling motions between the torque transmission balls and the ball grooves and, in particular, the cross groove constant velocity universal joint is employed in association with a drive shaft of an automotive vehicle in which the rattling motions should be suppressed.

E. R. Wagner, in his "Universal Joint and Driveshaft Design Manual", SAE, 1991, p. 163-166, (hereinafter referred to as the non-patent document) discloses the most fundamental cross groove constant velocity universal joint.

This non-patent document describes that the number of rolling elements is four or more, generally six, and, under the condition, in which the constant velocity universal joint assumes the maximum working angle, the slant angle between the ball grooves is so chosen that the ball grooves defined in the inner ring and the outer ring, respectively, so as to oppose to each other will not assume a parallel relation to each other. The non-patent document also describes that the crossing angle β defined between respective axes of the inner and outer rings is generally within the range of 13 to 19°.

The Japanese Laid-open Patent Publication No. H05-231435 (hereinafter referred to as the patent document) suggests that, in order to avoid reduction of the maximum working angle when the crossing angle between the ball grooves relative to the axis is reduced, the ball grooves are slanted not only relative to the axis, but also in a plane containing the axis.

The cross groove constant velocity universal joint is generally considered having the maximum working angle that cannot be increased. This is because the wedge angle defined by the ball grooves in the inner and outer rings has a reversible angle (limit angle) when the joint assumes a large working angle. It is considered that if the working angle of the joint exceeds the limit angle, a cage holding the balls is no longer able to assume a load balance and will become unstable enough to permit the constant velocity universal joint to lose its functionality. This phenomenon is confirmed with the standard universal joint having six torque transmission balls, and the limit angle is generally understood as determined by the contact angle α and the crossing angle β of the ball grooves.

In the patent document referred to above, it is formulated that the limit angle can be increased when the ball grooves are slanted in the plane containing the axis. However, it will assume a very difficult shape in terms of manufacture and quality control.

In the cross groove constant velocity universal joint, the wedge angle is formed at the crossing area, where each of the ball grooves in the inner ring and the respective ball groove in the outer ring that is paired with such ball groove in the inner ring at the time the torque is transmitted. By the effect of this wedge angle, the torque transmission ball in each crossing area is apt to run out of such crossing area, but is urged against a pocket face in the cage. Since the inner and outer rings are formed with the respective grooves slanted reversely relative to each other with respect to the axis and the reversely slanted grooves are arranged so as to alternate in a circumferential direction, the neighboring balls tend to move out of the respective crossing area in directions opposite to each other. For this reason, the cage is positioned by the balls. Each of the crossing area of the grooves forms bisectional faces of the working angle at all times. Accordingly, the torque transmission balls are retained at the respective crossing areas of the ball grooves at all times and, even when a displacement in angle occurs between the inner and outer rings, they are maintained within the bisectional faces of the ball grooves at all times. Thus, the cross groove constant velocity universal joint has a velocity-constancy characteristic and is an excellent universal joint with minimized rattling motion.

However, the cross groove constant velocity universal joint is incapable of assuming a relatively large working angle as compared with a constant velocity universal joint of a type, in which the torque transmission balls are controlled by offsetting the center of arcuate ball grooves formed respectively in the inner and outer rings so as to extend axially. This is because when the large working angle is to be assumed, the wedge angle referred to above is inverted enough to disrupt the balance of the force acting from the torque transmission balls to the cage. As a result, the cage fails to maintain the balance of the force and eventually loses the stability.

It may, however, be contemplated to increase the crossing angles β between the ball grooves in the inner or outer rings and the axis of the inner or outer ring to thereby avoid the inversion of the wedge angles. However, since the inner and outer rings are such that the ball grooves, which are slanted in respective directions opposite to each other with respect to the axis, are alternately arranged in the circumferential direction, increase of the crossing angles β is limited because of the necessity to avoid interference between the neighboring ball grooves.

The crossing angles β in the cross groove constant velocity universal joint, which are defined between the ball grooves in the inner or outer rings and the axis of the inner or outer ring, are associated with the sliding stroke of the constant velocity universal joint and, therefore, reduction of the crossing angles β is effective to increase the stroke.

However, reduction of the crossing angle β in order to secure the increased sliding stroke of the constant velocity universal joint results in reduction of the maximum working angle of the constant velocity universal joint. The maximum working angle referred to previously is the angle at which, when the joint once bent is operated to return to the initial position while held under a non-rotating condition, a phenomenon in which the extremely high torque acts. In the worst case it may occur, the angle may freeze and will not return to the initial angle, that is, the phenomenon in which the locking or scratching may occur. Such locking during the bending poses a problem particularly when the constant velocity universal joint is to be installed onto the automotive vehicle.

When the constant velocity universal joint is to be installed on the automotive vehicle, the constant velocity universal joint once bent must be returned to the initial position. Because of this, if the working angle is small and the locking occurs when the constant velocity universal joint is bent, the workability in installing the constant velocity universal joint onto the automotive vehicle is lowered considerably.

SUMMARY OF THE INVENTION

An object of the present invention to provide a cross groove constant velocity universal joint for use in association with a drive shaft or a propeller shaft, in which even through the crossing angle $\beta$ between each ball groove and the axis is reduced to secure the sliding stroke, the maximum working angle will not be reduced; an excellent bending characteristic with minimized lock occurring during the bending can be obtained; the assemblability during installation onto the automotive vehicle can be increased; and an excellent velocity-constancy characteristic can be obtained.

The cross groove constant velocity universal joint of the present invention is a cross groove constant velocity universal joint for use in association with a drive shaft or a propeller shaft of an automotive vehicle, which joint includes an inner ring, an outer ring, torque transmission balls and a cage intervening between an inner peripheral surface of the outer ring and an outer peripheral surface of the inner ring for retaining the torque transmission balls in circumferentially equally spaced relation to each other. The inner ring has an outer peripheral surface formed with ball grooves that are alternately slanted in respective directions opposite to each other relative to an axis of the inner ring while alternating with each other in a direction circumferentially of the inner ring. Similarly, the outer ring has an inner peripheral surface formed with ball grooves that are alternately slanted in respective directions opposite to each other relative to an axis of the outer ring while alternating with each other in a direction circumferentially of the outer ring. Each of the torque transmission balls retained by the cage is received in part within the corresponding ball groove in the inner ring and in part within the associated ball groove in the outer ring and positioned at a crossing area where each of the ball grooves in the inner ring and the associated ball groove in the outer ring are crossed with each other. The number of the torque transmission balls is chosen to be ten and the crossing angle defined between each of the ball grooves in the inner ring, which is slanted in one direction relative to the axis of the inner ring, and a respective ball groove in the outer ring, which is slanted relative to the axis of the outer ring in a direction opposite to such ball groove in the inner ring, is chosen to be within the range of 10 to 15°, where the constant velocity universal joint is used in association with the drive shaft, or within the range of 6 to 9° where the constant velocity universal joint is used in association with the propeller shaft. It is to be noted that the drive shaft referred to hereinabove and hereinafter is a shaft used to connect a differential gear unit and an automobile wheel together whereas the propeller shaft referred to hereinabove and hereinafter is a shaft used to connect a transmission or a combustion engine and the differential gear unit together. In general, the drive shaft is driven at a speed higher than the propeller shaft.

In the cross groove constant velocity universal joint that is used in association with the drive shaft, when the crossing angle $\beta$ defined between each of the ball grooves in the inner ring and the associated ball groove in the outer ring relative to the axis of the inner ring or the outer ring is chosen to be within the range of 10 to 15° and the number of the torque transmission balls is chosen to be ten, the maximum working angle of the universal joint will not be reduced and a sliding stroke can be secured. As already stated, in the cross groove constant velocity universal joint, if the torque transmission balls exist in a certain phase and the working angle is increased, the wedge angle will be inverted and the balance of a force given from the torque transmission balls to the retainer will collapse, causing the retainer to be instable. When the crossing angle $\beta$ defined between each of the ball grooves in the inner ring and the associated ball groove in the outer ring relative to the axis of the inner ring or the outer ring decreases to a small value, this phenomenon occurs considerably where the number of the torque transmission balls is up to six. However, if the number of the torque transmission balls is chosen to be ten, even though the crossing angle $\beta$ defined between each of the ball grooves in the inner ring and the associated ball groove in the outer ring relative to the axis of the inner ring or the outer ring decreases, the drive of the retainer can be stabilized until the crossing angle $\beta$ attains to a certain value. This is because the driving force of the torque transmission balls, of which wedge angle has been inverted, are shared by the other torque transmitting balls to permit the drive of the retainer to be stabilized.

In the cross groove constant velocity universal joint that is used in association with the drive shaft, since the required working angle is about 20°, the result of analysis conducted with the working angle up to 25° has revealed that if the crossing angle $\beta$ of the ball grooves is equal to or greater than 8°, the bending property is excellent as compared with that exhibited by the conventional constant velocity universal joint employing the six torque transmission balls.

It is well known that reduction of the crossing angle $\beta$ of the ball grooves results in deterioration of the velocity-constancy characteristic which is an important functionality of the constant velocity universal joint. However, it has been ascertained through the analysis that when the number of the torque transmission balls is chosen to be ten, the velocity-constancy characteristic will not be deteriorated even though the crossing angle $\beta$ of the ball grooves is reduced. As a result of analytical comparison of the velocity-constancy characteristic at the working angle of 20°, that is required by the cross groove constant velocity universal joint used in association with the drive shaft, when the number of the torque transmission balls is six and the crossing angle $\beta$ of the ball grooves is 16°, it was found possible to provide the cross groove constant velocity universal joint excellent in isokinetic characteristic if the number of the torque transmission balls is ten and the crossing angle $\beta$ of the ball grooves is equal to and greater than 10°.

In order to strike a balance between the bending property and the velocity-constancy characteristic, it is preferable that the lowermost limit of the crossing angle $\beta$ should be 10°.

Since the ball grooves in each of the inner and outer rings are alternately slanted in the respective directions opposite to each other on the peripheral surface thereof, too large crossing angle may result in interference of the neighboring ball grooves with each other. Accordingly, the practically uppermost limit of the crossing angle $\beta$ of the ball grooves in the constant velocity universal joint for use in association with the drive shaft is preferably equal to and smaller than 15°.

As described above, even though the sliding stroke is secured with the reduced crossing angle β of the ball grooves, the maximum working angle will not be reduced and the excellent bending property with minimized lock during the bending can be obtained. For this reason, the assemblability during assemblage of the automotive vehicle can be increased. Also, it is possible to render the velocity-constancy characteristic to be excellent.

On the other hand, in the cross groove constant velocity universal joint that is used in association with the propeller shaft, when the crossing angle β defined between each of the ball grooves in the inner ring and the associated ball groove in the outer ring relative to the axis of the inner ring or the outer ring is chosen to be within the range of 6 to 9° and the number of the torque transmission balls is chosen to be ten, the maximum working angle of the universal joint will not be reduced and a sliding stroke can be secured.

Since in the cross groove constant velocity universal joint used in association with the propeller shaft, the required working angle is about 10°, the result of analysis conducted with the working angle up to 15° has revealed that if the crossing angle β of the ball grooves is equal to or greater than 5°, the excellent bending property can be obtained as compared with that exhibited by the conventional constant velocity universal joint employing the six torque transmission balls.

Also, as a result of analytical comparison of the velocity-constancy characteristic at the working angle of 10°, that is required by the cross groove constant velocity universal joint used in association with the propeller shaft, when the number of the torque transmission balls is six and the crossing angle β of the ball grooves is 10°, it was found possible to provide the cross groove constant velocity universal joint excellent in velocity-constancy characteristic if the number of the torque transmission balls is ten and the crossing angle β of the ball grooves is equal to and greater than 6°.

In order to strike a balance between the bending property and the velocity-constancy characteristic, it is preferable that the lowermost limit of the crossing angle β should be 6°.

Since the ball grooves in each of the inner and outer rings are alternately slanted in the respective directions opposite to each other on the peripheral surface thereof, too large crossing angle β may result in interference of the neighboring ball grooves with each other. This is particularly considerable when the number of the torque transmission balls increases. Accordingly, the practically uppermost limit of the crossing angle β of the ball grooves in the constant velocity universal joint for use in association with the propeller shaft is preferably equal to and smaller than 9°.

It is to be noted that even though the number of the torque transmission balls is chosen to be eight, the bending property excellent as compared with that exhibited by the conventional constant velocity universal joint employing the six torque transmission balls can be obtained. However, if the number of the torque transmission balls is chosen to be eight, the pair of the ball grooves defined in the outer ring or the inner ring at diametrically opposite positions are slanted in respective directions opposite to each other. For this reason, the pairs of the ball grooves cannot be simultaneously machined with less processability, resulting in reduction of the productivity and increase of the cost. In contrast thereto, if the number of the torque transmission balls is chosen to be ten, the pairs of the ball grooves defined in the outer ring or the inner ring at diametrically opposite positions can be slanted in the same directions. Because of this, the pairs of the ball grooves can be simultaneously machined and the processability of those ball grooves is good, resulting in an excellent productivity and reduction of the cost.

In the present invention, the groove contact angle is preferably chosen to be within the range of 30 to 50° and more preferably within the range of 40 to 50°. If the increased groove contact angle is employed, it is possible to avoid the propensity of occurrence of the scratching during the bending even though the contact factor (which is the ball groove diameter divided by the ball diameter) is large.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENT

Figure 1:
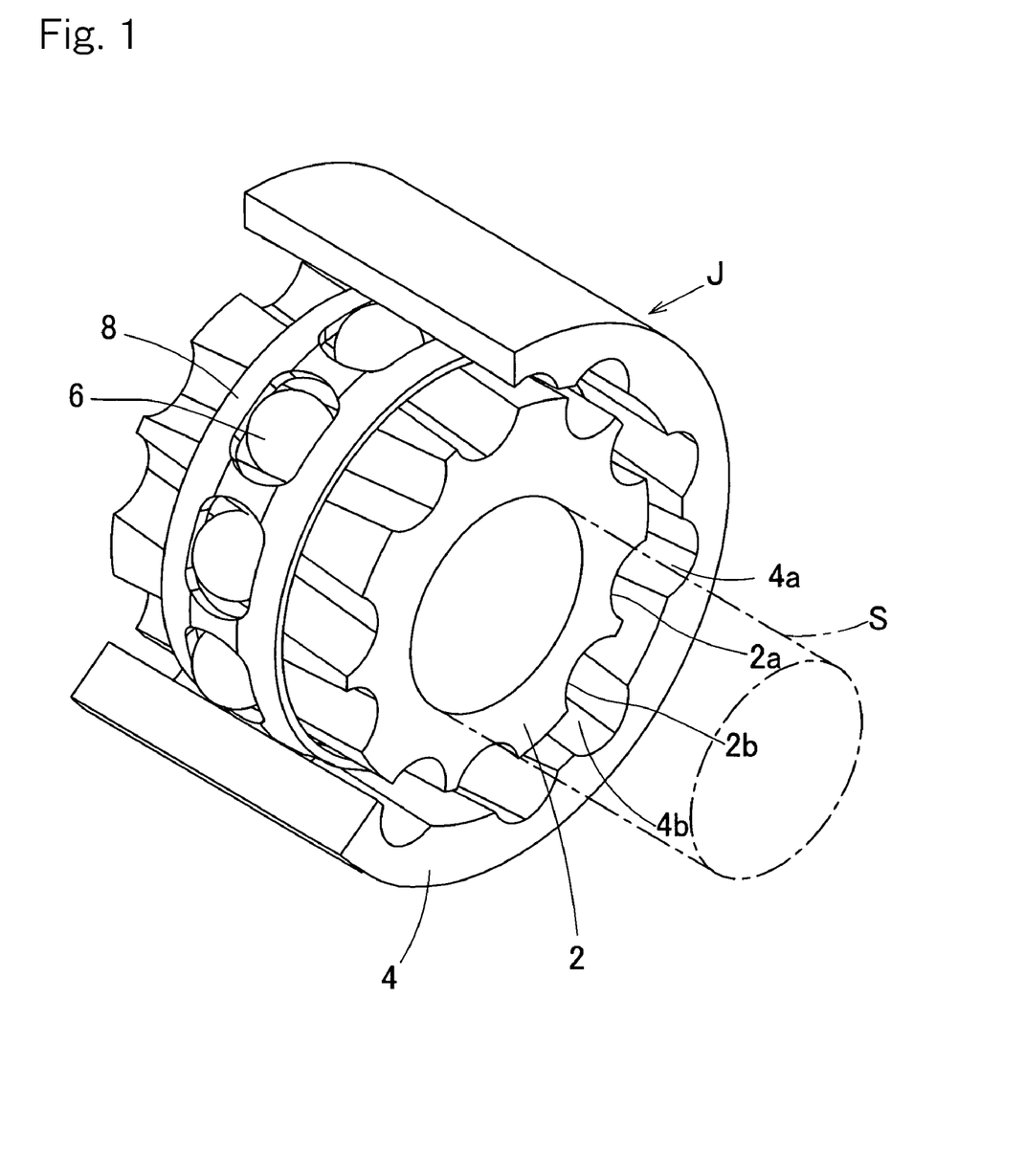
FIG. 1 is a fragmentary cutout perspective view of a cross groove constant velocity universal joint according to a preferred embodiment of the present invention.
Figure 2:
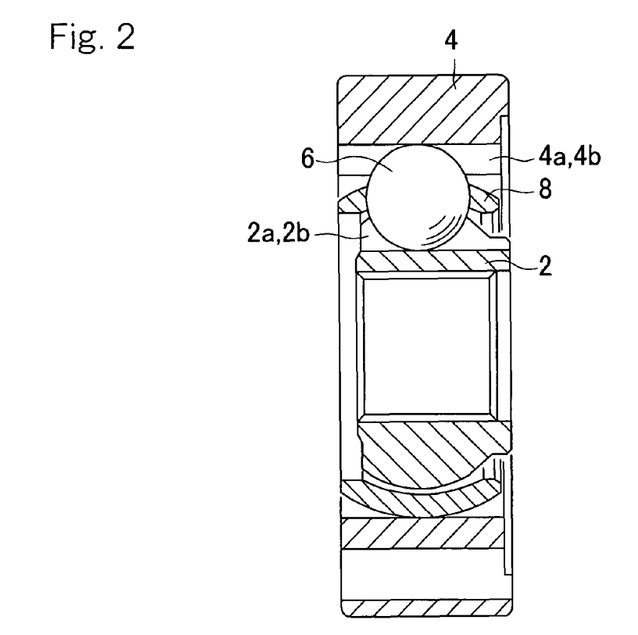
FIG. 2 is a sectional view of the cross groove constant velocity universal joint.

A preferred embodiment of the present invention will now be described with reference to the accompanying drawings. Referring to FIG. 1, a cross groove constant velocity universal joint J shown therein is drivingly coupled with one end of a drive shaft or a propeller shaft S and is assembled with essential component parts including an inner ring 2, an outer ring 4, torque transmission balls 6 and a cage 8.

Figure 3:
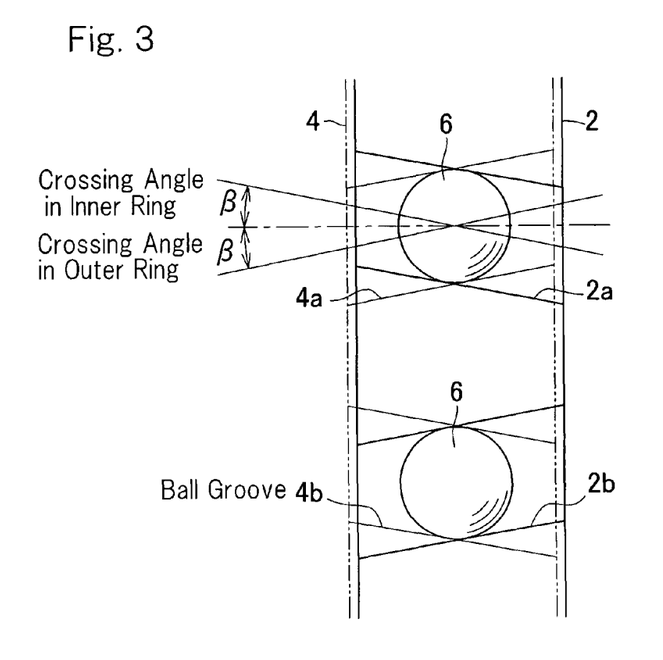
FIG. 3 is a diagram showing some ball grooves of the cross groove constant velocity universal joint shown as developed in a plane.

The inner ring 2 is in the form of a ring having an outer peripheral surface formed with a plurality of ball grooves 2a and 2b. Similarly, the outer ring 4 is in the form of a ring having an inner peripheral surface formed with a plurality of ball grooves 4a and 4b. FIG. 3 illustrates the ball grooves in developed form and, as shown by the solid lines in FIG. 3, the ball grooves 2a and 2b slanted in respective directions opposite to each other with respect to an axis of the inner ring 2 are arranged alternately in a direction circumferential thereof. Also, as shown by the double-dotted chain lines, the ball grooves 4a and 4b slanted in respective directions opposite to each other with respect to an axis of the outer ring 4 are arranged alternately in a direction circumferentially thereof.

The crossing angle formed between each of the ball grooves 2a, 2b, 4a, 4b and the axis of the inner ring 2 or the outer ring 4 is indicated by β. In the case of the cross groove constant velocity universal joint being used in association with the drive shaft, the crossing angle β is chosen to be within the range of 10° to 15°.

Figure 4:
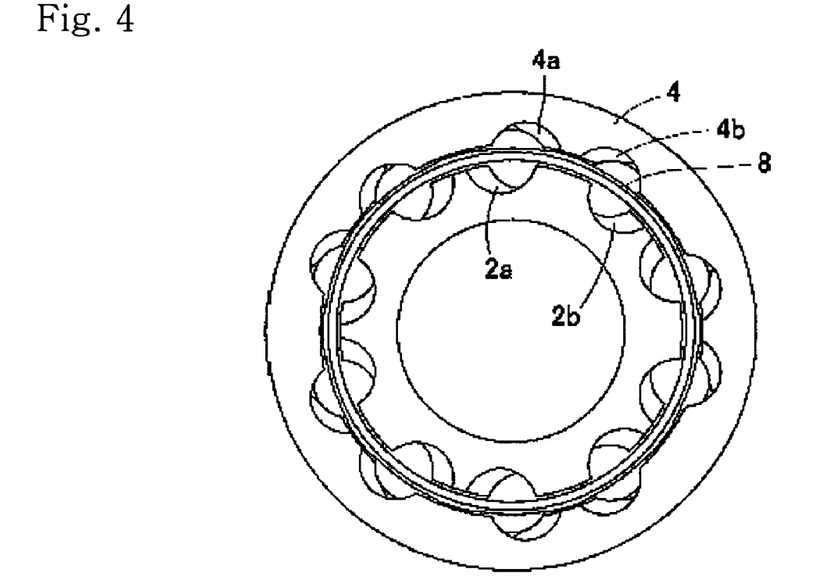
FIG. 4 is a front elevational view of the cross groove constant velocity universal joint with balls removed.

The torque transmission ball 6 is operatively received in each intersection of the ball grooves 2a and the ball groove 4a paired with such ball groove 2a, or in each intersection of the ball grooves 2b and the ball groove 4b paired with such ball groove 2b. As best shown in FIG. 4, in the illustrated embodiment, the inner ring 2 makes use of the ten alternating ball grooves 2a and 2b and, similarly, the outer ring 4 makes use of the ten alternating ball grooves 4a and 4b that are cooperable with the ten ball grooves 2a and 2b, respectively, and, accordingly, the number of the torque transmission balls 6 that may be employed therein is ten.

Figure 5:
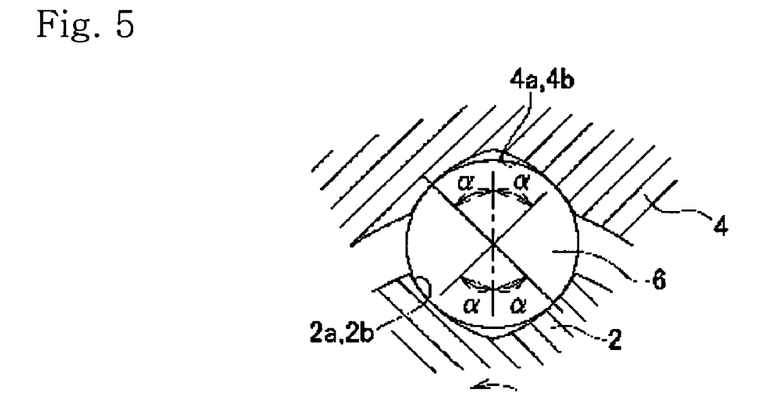
FIG. 5 is a sectional view showing the ball grooves in the cross groove constant velocity universal joint.
Figure 6:
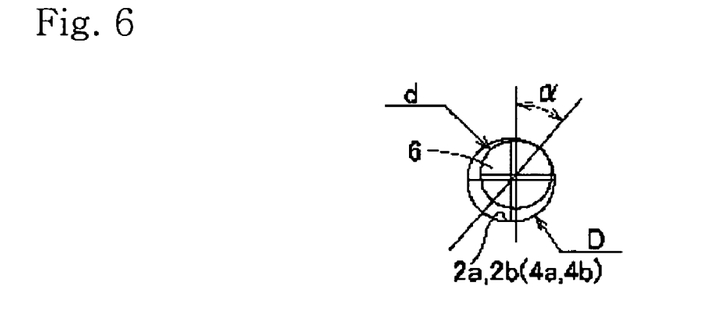
FIG. 6 is an explanatory diagram showing the relation between the ball grooves and the balls in the cross groove constant velocity universal joint.

As shown in FIG. 5, each of the ball grooves 2a, 2b, 4a and 4b defined in the inner and outer rings 2 and 4 has a sectional shape generally similar to the shape of the Gothic arch or an ellipsoidal shape and is held in an angular contact relation with the corresponding torque transmission ball 6. The angular contact angle indicated by α in FIG. 5 is chosen to be, for example, within the range of 30 to 50°.

The lock occurring during the bending of the cross groove constant velocity universal joint used in association with the drive shaft will now be described based on the analytical result.

Figure 7:
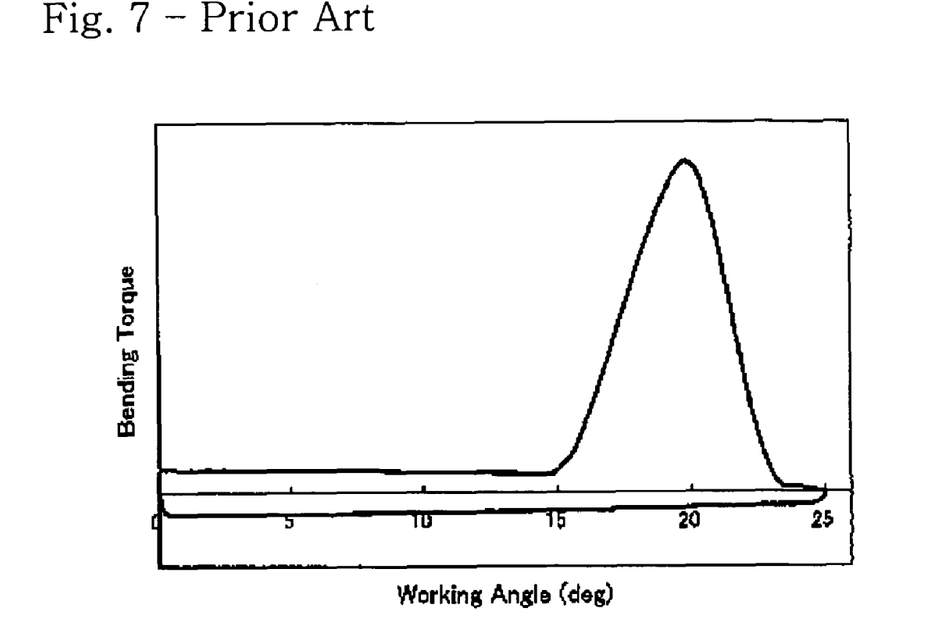
FIG. 7 is a chart showing the relation between the working angle and the bending torque in the conventional cross groove constant velocity universal joint.

The lock referred to previously is a phenomenon in which an excessive torque comes to be required when the joint once operated to a certain working angle is operated to return to the initial angle. FIG. 7 illustrates the relation between the working angle and the bending torque in the conventional cross groove constant velocity universal joint, in which the number of the torque transmission balls employed is six. Each of torque curves shown therein indicates that of the bending torque in the phase at which the scratch occurs. When the scratch occurs, the torque exhibits a peak at a certain working angle.

Figure 8:
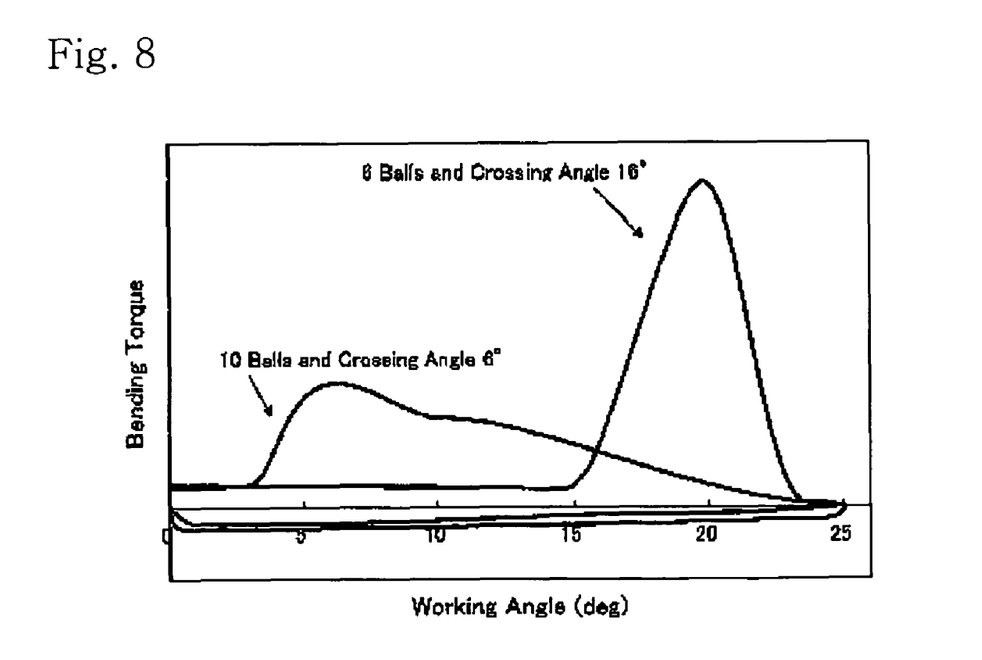
FIG. 8 is a chart showing the relation between the working angle and the bending torque in the conventional cross groove constant velocity universal joint and that in the embodiment of the present invention.

To describe major dimensions of the analytical model used in FIG. 8, the crossing angle β is 16° in the case of the six torque transmission balls used. The crossing angle β in the case of the model, in which the number of the torque transmission balls is ten, is 6°.

FIG. 8 illustrates the relation between the working angle and the bending torque in the cross groove constant velocity universal joint utilizing ten balls such as in the illustrated embodiment of the present invention. As shown therein, if the number of the torque transmission ball is chosen to be ten, the bending torque at the time of locking is reduced.

On the other hand, when the number of the torque transmission balls is ten, the bending torque at the time of locking is reduced to about one third of that when the number of the torque transmission balls is six, for a given gap setting between the balls and the ball grooves.

Figure 9:
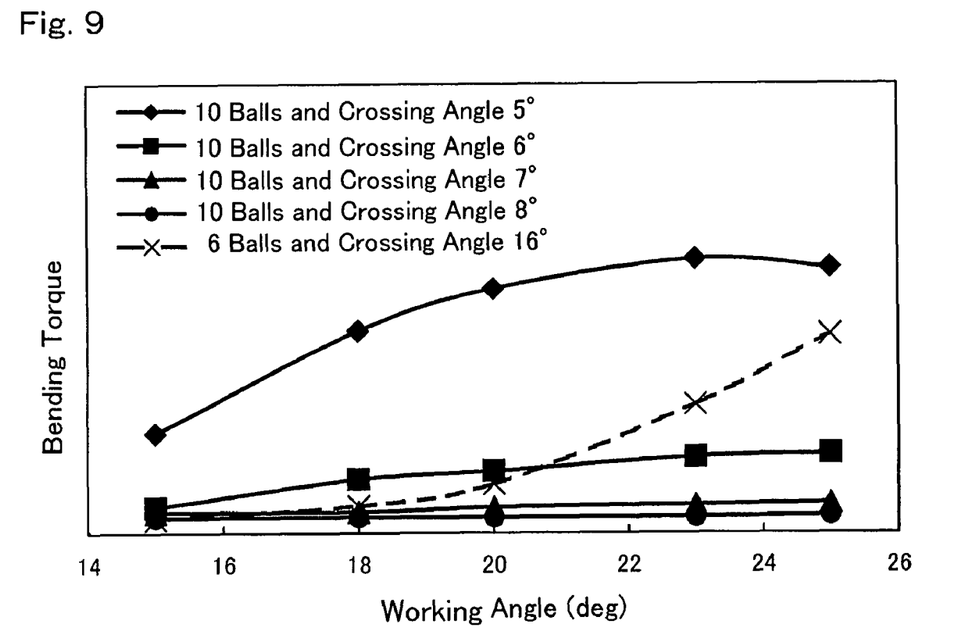
FIG. 9 is a chart showing the relation between the working angle and the bending torque exhibited by various models, in which different crossing angles are employed.

The relation between the crossing angle β and the working angle will now be described. FIG. 9 illustrates the analytical result of the relation between the working angle and the bending torque exhibited when the crossing angle β are changed to various values while the number of the torque transmission balls is ten. A curve exhibited when the crossing angle is chosen to be 16° while the number of the torque transmission balls is chosen to be six is also shown in FIG. 9. It is to be noted that the crossing angle shown in this figure is expressed in terms of degree.

According to FIG. 9, in those cases in which the crossing angle is equal to and greater than 8°, over the working angle ranges from 15° to 25° the bending torque is kept at a low value. In contrast thereto, in the universal joint in which the number of the torque transmission balls is six, the bending torque abruptly increase as the working angle increase from a value in the vicinity of 18° even though the crossing angle is large of 16°. Accordingly, it can readily be understood that with the universal joint in which the number of the torque transmission balls is chosen to be ten, the bending property can be improved, as compared with that in which the number of the torque transmission balls is six, when the crossing angle is equal to or greater than 10°. In the case of the cross groove constant velocity universal joint for use in association with the drive shaft, since the required working angle is generally about 20°, it is considered satisfactory if the bending torque is low when the working angle is up to 25°.

Figure 10:
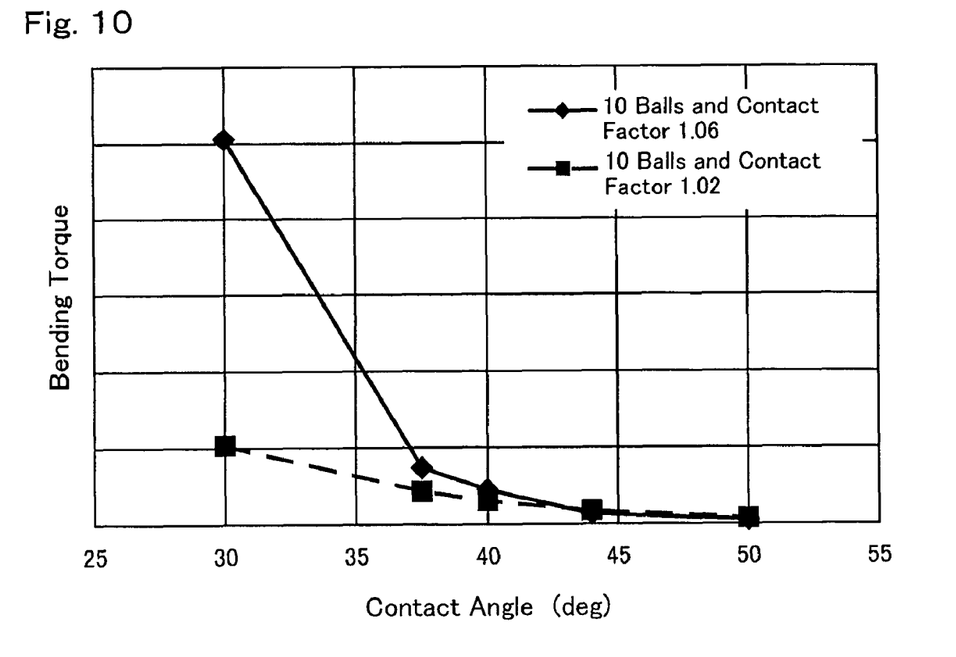
FIG. 10 is a chart showing the relation between the contact angle and the bending torque exhibited by various models, in which the number of the torque transmission balls is ten, but different ball contact factors are employed.

The relation between the contact angle α, the contact factor D/d and the bending torque will now be described. FIG. 10 illustrates the relation between the contact angle α and the bending torque when the contact factor in the universal joint, in which the number of the torque transmission balls is ten, is chosen to be 1.06 and 1.02. The ball contact factor is a value expressed by the groove diameter D divided by the ball diameter d. In the case of the universal joint including the ten torque transmission balls, influences brought about by the contact factor diminish when the contact angle is 40°.

Where the number of the torque transmission balls is chosen to be ten, the bending torque will take a low value at the ball contact factor of 1.02, even through the contact angle is 30°. Because of this, the contact angle is considered practically applicable where the contact angle is within the range of 30 to 50°. However, if the ball contact factor is chosen to be of a greater value than 1.02, for example, equal to or greater than 1.06, the contact angle is preferably chosen to be equal to or greater than 40°, at which the ball contact factor will no longer affect the bending torque.

Figure 11:
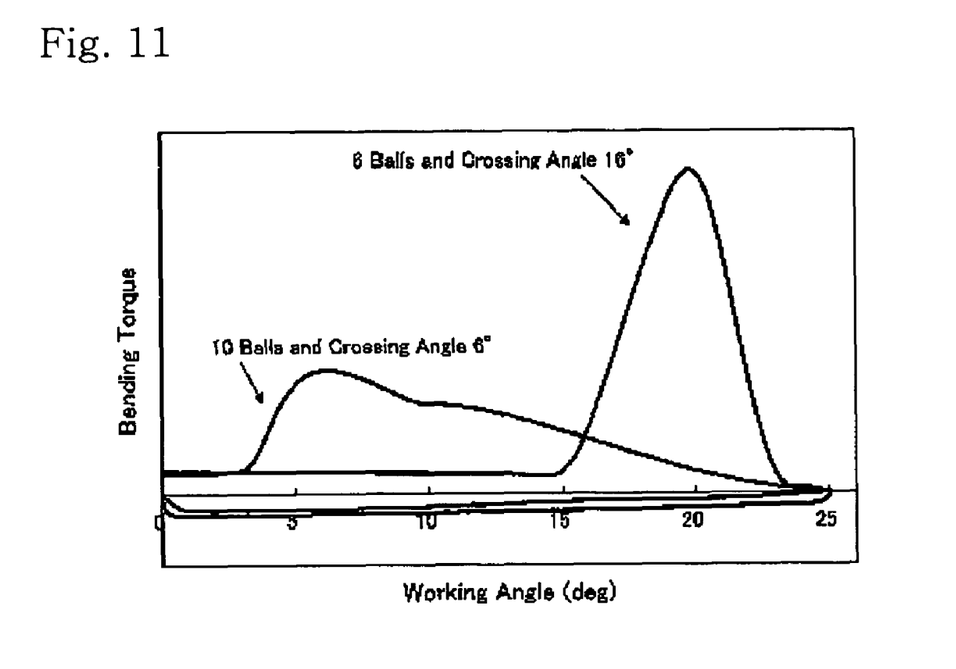
FIG. 11 is a chart showing the relation between the crossing angle and the velocity-constancy characteristic exhibited when the working angle is 20°.

The velocity-constancy characteristic will be described. FIG. 11 illustrates a change in velocity-constancy characteristic resulting from the difference in crossing angle when various working angles are assumed one at a time in the cross groove constant velocity universal joint employing the ten torque transmission balls, wherein the axis of abscissas represents the crossing angle and the axis of ordinate represents the velocity-constancy characteristic. The velocity-constancy characteristic is a value expressed by the difference between the number of input rotations and the number of output rotations, which is divided by the number of input rotations, i.e., (Input Rotational Number−Output Rotational Number)/(Input Rotational Number).

In general, the smaller the working angle or the larger the crossing angle, the better the value of the velocity-constancy characteristic. A curve shown in FIG. 11 represents the analytical result of the velocity-constancy characteristic when in the universal joint employing the six torque transmission balls at the crossing angle of 16°, the working angle is chosen to be 20°, which is the performance required in the application to the drive shaft.

In the case of the working angle of 20°, in the universal joint employing the ten torque transmission balls 6, the velocity-constancy characteristic exhibited thereby is comparable to that exhibited by the conventional joint when the crossing angle β is chosen to be 10°. However, the velocity-constancy characteristic takes a better value than that exhibited by the conventional joint when the crossing angle β is chosen to be of a value greater than 10°.

As discussed above, when the number of the torque transmission balls is chosen to be ten, in the case of the working angle being 20° which is required in the universal joint for use in association with the drive shaft, the velocity-constancy characteristic is about equal to that exhibited by the conventional universal joint even though the crossing angle is reduced down to 10°. Also, in terms of the velocity-constancy characteristic, the universal joint employing the ten torque transmission balls can afford to have a sliding stroke with reduced crossing angle β. In order to strike a balance between the bending property and the velocity-constancy characteristic, it is preferable that the lowermost limit of the crossing angle β should be 10°.

An increase of the crossing angle can be beneficial to improve. However, as hereinbefore discussed, if the crossing angle is too large, the neighboring ball grooves will interfere with each other. Accordingly, considering the practically acceptable range, in the case of the cross groove constant velocity universal joint for use in association with the drive shaft, which employs the ten torque transmission balls, the maximum acceptable crossing angle is considered 15°.

In view of the foregoing, the crossing angle β is preferably within the range of 10 to 15°.

It is to be noted that when the number of the torque transmission balls 6 is chosen to be ten, the torque transmission balls 6 will become small. Accordingly, the surface pressure at the point of contact between each torque transmission ball 6 and the paired ball grooves 2a and 4a or 2b and 4b will become high as compared with that in the universal joint employing the six torque transmission balls, provided that the same load is imposed on the individual torque transmission balls 6. However, when the number of the torque transmission balls is chosen to be ten, the number of the balls increases and as a result, the load imposed on the individual torque transmission balls 6 become low. Therefore, it is possible to employ a design effective to eliminate the problem associated with the surface pressure.

Also, the cross groove constant velocity universal joint employing the ten torque transmission balls 6 has an excellent productivity. In other words, in the cross groove constant velocity universal joint, even though the number of the torque transmission balls 6 is chosen to be eight, it can exhibit the excellent bending property as compared with that exhibited by the conventional universal joint employing the six torque transmission balls. However, if the number of the torque transmission balls is chosen to be eight, the pair of the ball grooves defined in the outer ring 4 or the inner ring 2 at diametrically opposite positions are slanted in respective directions opposite to each other. Therefore, the pairs of the ball grooves cannot be simultaneously machined with less processability, resulting in reduction of the productivity and increase of the cost. In contrast thereto, if the number of the torque transmission balls 6 is chosen to be ten, the pairs of the ball grooves 4a, 4a, 4b, 4b or 2a, 2a, 2b, 2b defined in the outer ring 4 or the inner ring 2 at diametrically opposite positions can be slanted in the same directions. Because of this, the pairs of the ball grooves can be simultaneously machined and the processability of those ball grooves 2a, 2b, 4a and 4b is good, resulting in an excellent productivity and reduction of the cost.

Hereinafter, the cross groove constant velocity universal joint for use in association with the propeller shaft will now be described. In this case, the crossing angle β of the ball grooves 2a, 2b, 4a and 4b relative to the axis is chosen to be within the range of 6 to 9°.

The lock occurring during the bending in the cross groove constant velocity universal joint for use in association with the propeller shaft will be discussed based on the analytical result.

Figure 12:
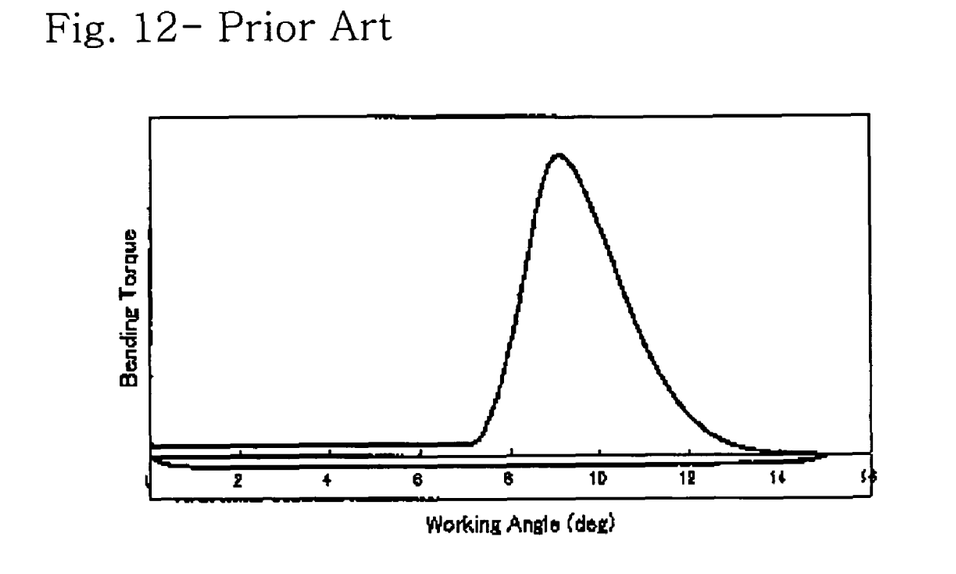
FIG. 12 is a chart showing the relation between the working angle and the bending torque exhibited by the conventional cross groove constant velocity universal joint.

The lock referred to above is a phenomenon in which an excessive torque is required when the universal joint once assuming the working angle returns to the initial position. FIG. 12 illustrates the relation between the working angle and the bending torque when the number of the torque transmission balls is six. The torque curve shown therein is representative of the bending torque in a phase in which the lock occurs. When the lock occurs, the torque reaches a peak at a certain working angle.

Figure 13:
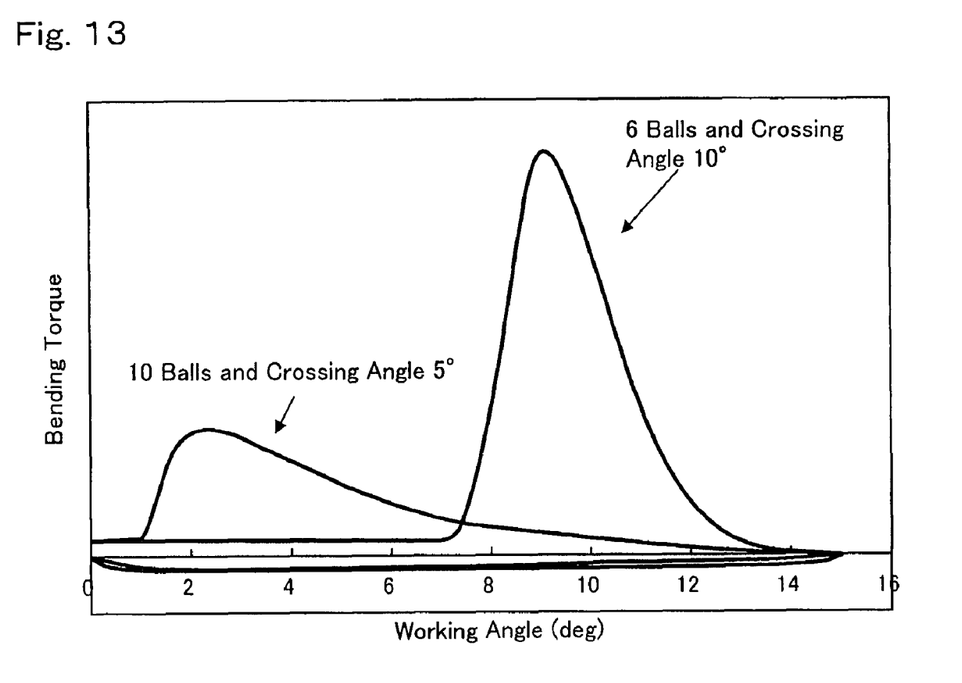
FIG. 13 is a chart showing the relation between the working angle and the bending torque exhibited by the conventional cross groove constant velocity universal joint and that in the embodiment of the present invention.

To describe major dimensions of the analytical model used in FIG. 13, the crossing angle β is 10° in the case of the mode, in which the six torque transmission balls are used, and the crossing angle β is 5° in the case of the model, in which the ten torque transmitting balls are used.

FIG. 13 illustrates the relation between the working angle and the bending torque exhibited by the cross groove constant velocity universal joint employing the ten torque transmission balls such as in the foregoing embodiment. As shown therein, when the number of the torque transmission balls is increased to ten, the bending torque at the time of locking can be reduced.

If the number of the torque transmission balls is chosen to be ten, the bending torque at the time of locking for a given gap setting will be about one third of that exhibited by the universal joint employing the six torque transmission balls.

Figure 14:
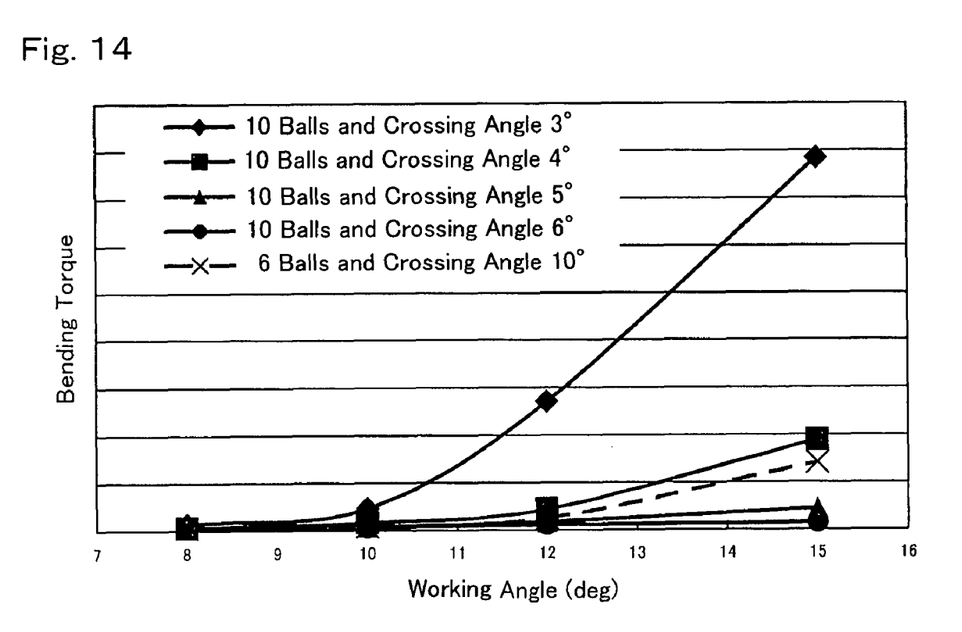
FIG. 14 is a chart showing the relation between the working angle and the bending torque exhibited by various models, in which different crossing angles are employed.

The relation between the crossing angle β and the working angle will be described. FIG. 14 illustrates the analytical result of the relation between the working angle and the bending torque exhibited by the constant velocity universal joint employing the ten torque transmission balls, but in which the crossing angle β is changed to various values. A curve exhibited by the constant velocity universal joint, in which the six torque transmission balls are employed with the crossing angle of 10°, is also shown in FIG. 14. It is to be noted that the crossing angle is expressed in terms of degree.

According to FIG. 14, in each case in which the crossing angle is equal to and greater than 5°, the bending torque maintains a low value throughout the working angle of 8 to 15°. In contrast thereto, in the case of the constant velocity universal joint employing the six torque transmission balls, even though the crossing angle is large of 10°, the bending torque abruptly increase as the working angle increases from a value in the vicinity of 12°. Accordingly, it can readily be understood that with the universal joint in which the number of the torque transmission balls is chosen to be ten, the bending property can be improved, as compared with that in which the number of the torque transmission balls is six, when the crossing angle is equal to or greater than 5°.

In the case of the cross groove constant velocity universal joint for use in association with the propeller shaft, the required working angle is generally about 10°. Accordingly, it is considered satisfactory if the bending torque keeps low until the working angle is up to 15°.

Figure 15:
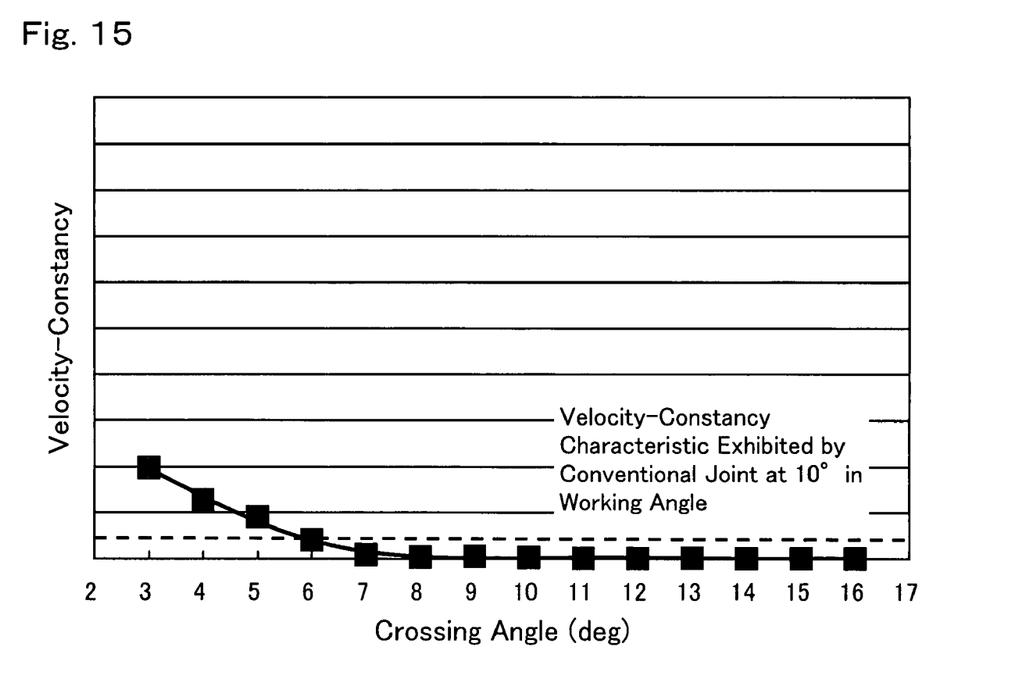
FIG. 15 is a chart showing the relation between the crossing angle and the velocity-constancy characteristic exhibited when the working angle is 10°.

The velocity-constancy characteristic will be described. FIG. 15 illustrates a change in velocity-constancy characteristic resulting from the difference in crossing angle when various working angles are assumed one at a time in the cross groove constant velocity universal joint employing the ten torque transmission balls, wherein the axis of abscissas represents the crossing angle and the axis of ordinate represents the velocity-constancy characteristic.

The velocity-constancy characteristic is a value expressed by the difference between the number of input rotations and the number of output rotations, which is divided by the number of input rotations, i.e., (Input Rotational Number−Output Rotational Number)/(Input Rotational Number).

In general, the smaller the working angle or the larger the crossing angle, the better the value of the velocity-constancy characteristic. A curve shown in FIG. 15 represents the analytical result of the velocity-constancy characteristic when in the universal joint employing the six torque transmission balls at the crossing angle of 10°, the working angle is chosen to be 10°, which is the performance required in the application to the drive shaft.

In the case of the working angle of 10°, in the universal joint employing the ten torque transmission balls 6, the velocity-constancy characteristic exhibited thereby is comparable to that exhibited by the conventional joint when the crossing angle β is chosen to be 6°, but takes a better value than that exhibited by the conventional joint when the crossing angle β is chosen to be of a value greater than 6°.

As discussed above, when the number of the torque transmission balls is chosen to be ten, in the case of the working angle being 10° which is required in the universal joint for use in association with the propeller shaft, the velocity-constancy characteristic is about equal to that exhibited by the conventional universal joint even though the crossing angle is reduced down to 6°. Also, in terms of the velocity-constancy characteristic, the universal joint employing the ten torque transmission balls can afford to have a sliding stroke with reduced crossing angle β. In order to strike a balance between the bending property and the velocity-constancy characteristic, it is preferable that the lowermost limit of the crossing angle β should be 6°.

If the crossing angle is large, it is particularly advantageous in respect of the bending property. However, as hereinbefore discussed, if the crossing angle is too large, the neighboring ball grooves will interfere with each other. Accordingly, considering the practically acceptable range, in the case of the cross groove constant velocity universal joint for use in association with the propeller shaft, which employs the ten torque transmission balls, the maximum acceptable crossing angle is considered 9°.

In view of the foregoing, the crossing angle β is preferably within the range of 6 to 9°.

What is claimed is:

1. A cross groove constant velocity universal joint for use in association with a drive shaft of an automotive vehicle, the joint comprising:
    an inner ring having an outer peripheral surface formed with ball grooves that are alternately slanted in respective directions opposite to each other relative to an axis of the inner ring while alternating with each other in a direction circumferentially of the inner ring;
    an outer ring having an inner peripheral surface formed with ball grooves that are alternately slanted in respective directions opposite to each other relative to an axis of the outer ring while alternating with each other in a direction circumferentially of the outer ring;
    ten torque transmission balls each received in part within the corresponding ball groove in the inner ring and in part within the associated ball groove in the outer ring and positioned at a crossing area where each of the ball grooves in the inner ring and the associated ball groove in the outer ring are crossed with each other; and
    a cage intervening between the outer peripheral surface of the inner ring and the inner peripheral surface of the outer ring to retain the torque transmission balls in circumferentially equally spaced relation to each other,
    wherein the crossing angle defined between each of the ball grooves in the inner ring, which is slanted in one direction relative to the axis of the inner ring, and a respective ball groove in the outer ring, which is slanted relative to the axis of the outer ring in a direction opposite to such ball groove in the inner ring, is within the range of 10 to 15°.

2. The cross groove constant velocity universal joint as claimed in claim 1, wherein a contact angle is within the range of 30 to 50°, the contact angle being an angle made by a joint radial line passing a ball center and a line including the ball center and a point of contact of the ball with the ball groove.

3. The cross groove constant velocity universal joint as claimed in claim 2, wherein the contact angle is within the range of 40 to 50°.

4. A cross groove constant velocity universal joint for use in association with a propeller shaft of an automotive vehicle, the joint comprising:
    an inner ring having an outer peripheral surface formed with ball grooves that are alternately slanted in respective directions opposite to each other relative to an axis of the inner ring while alternating with each other in a direction circumferentially of the inner ring;
    an outer ring having an inner peripheral surface formed with ball grooves that are alternately slanted in respective directions opposite to each other relative to an axis of the outer ring while alternating with each other in a direction circumferentially of the outer ring;
    ten torque transmission balls each received in part within the corresponding ball groove in the inner ring and in part within the associated ball groove in the outer ring and positioned at a crossing area where each of the ball grooves in the inner ring and the associated ball groove in the outer ring are crossed with each other; and
    a cage intervening between the outer peripheral surface of the inner ring and the inner peripheral surface of the outer ring to retain the torque transmission balls in circumferentially equally spaced relation to each other,
    wherein the crossing angle defined between each of the ball grooves in the inner ring, which is slanted in one direction relative to the axis of the inner ring, and a respective ball groove in the outer ring, which is slanted relative to the axis of the outer ring in a direction opposite to such ball groove in the inner ring, is within the range of 6 to 9°.

5. The cross groove constant velocity universal joint as claimed in claim 4, wherein a contact angle is within the range of 30 to 50°, the contact angle being an angle made by a joint radial line passing a ball center and a line including the ball center and a point of contact of the ball with the ball groove.

6. The cross groove constant velocity universal joint as claimed in claim 5, wherein the contact angle is within the range of 40 to 50°.

* * * * *